United States Patent [19]

Hickman

[11] Patent Number: 5,219,630
[45] Date of Patent: Jun. 15, 1993

[54] FIRE RESISTANT SAFETY GLASS

[75] Inventor: James A. Hickman, Edinburgh, United Kingdom

[73] Assignee: Miller Construction Limited, Edinburgh, United Kingdom

[21] Appl. No.: 875,213

[22] Filed: Apr. 28, 1992

Related U.S. Application Data

[60] Continuation of Ser. No. 617,767, Nov. 26, 1990, abandoned, which is a division of Ser. No. 391,544, Jul. 26, 1989, Pat. No. 4,978,405.

[30] Foreign Application Priority Data

Feb. 20, 1987 [GB] United Kingdom ............... 8704007
Jul. 28, 1987 [GB] United Kingdom ............... 8717850
Sep. 2, 1987 [GB] United Kingdom ............... 8720617

[51] Int. Cl.$^5$ .......................... B44C 5/08; B32B 7/02
[52] U.S. Cl. .................................. 428/38; 428/214; 428/215; 428/255; 428/417; 428/418; 428/425.6; 156/107
[58] Field of Search ............... 428/38, 214, 215, 255, 428/417, 418, 425.6, 107

[56] References Cited

U.S. PATENT DOCUMENTS

| | | | |
|---|---|---|---|
| 548,520 | 10/1895 | Croskey | 428/38 |
| 2,500,598 | 3/1950 | Axelrod | 428/133 |
| 2,659,686 | 11/1953 | Watkins | 156/92 |
| 3,703,425 | 11/1972 | Delmonte et al. | 156/107 |
| 4,537,830 | 8/1985 | Hermann et al. | 156/99 |
| 4,642,255 | 2/1987 | Dlubak | 156/99 |
| 4,683,172 | 7/1987 | LeGrand et al. | 428/412 |
| 4,724,023 | 2/1988 | Marriott | 156/102 |

FOREIGN PATENT DOCUMENTS

| | | |
|---|---|---|
| 879166 | 4/1953 | Fed. Rep. of Germany . |
| 1729087 | 6/1971 | Fed. Rep. of Germany . |
| 26862 | 9/1970 | Japan . |
| 112422 | 9/1976 | Japan . |
| 427234 | 10/1964 | Switzerland . |
| 25690 | 6/1932 | U.S.S.R. . |
| 69387 | 3/1945 | U.S.S.R. . |
| 742402 | 6/1980 | U.S.S.R. . |
| 743963 | 6/1980 | U.S.S.R. . |
| 833656 | 6/1981 | U.S.S.R. . |
| 872482 | 10/1981 | U.S.S.R. . |
| 383235 | 11/1932 | United Kingdom . |
| 1154611 | 6/1966 | United Kingdom . |
| 1142818 | 9/1966 | United Kingdom . |
| 1339980 | 4/1971 | United Kingdom . |
| 1600867 | 4/1977 | United Kingdom . |
| 2032844 | 5/1979 | United Kingdom . |
| 2051675 | 6/1980 | United Kingdom . |
| 2078166 | 6/1980 | United Kingdom . |
| 2113145 | 6/1982 | United Kingdom . |
| 2125732 | 8/1983 | United Kingdom . |
| 2155856 | 3/1985 | United Kingdom . |

Primary Examiner—Patrick J. Ryan
Assistant Examiner—Richard C. Weisberger
Attorney, Agent, or Firm—Davis, Hoxie, Faithfull & Hapgood

[57] ABSTRACT

A fire-resistant safety glazing product comprises at least two sheets of glazing material, e.g. glass, bonded together with an interlayer of adhesive binder material and metallic wire mesh of the type used in "wired glass" embedded in the interlayer.

Methods of manufacturing fire-resistant safety glazing products are disclosed.

7 Claims, 2 Drawing Sheets

FIRE RESISTANT SAFETY GLASS

This is a continuation of application Ser. No. 07/617,767 filed Nov. 26, 1990 now abandoned which application was a division of application Ser. No. 07/391,544 filed Jul. 26, 1989 now U.S. Pat. No. 4,978,405, and of International application PCT/GB88/10098 filed Feb. 17, 1988, which designated the United States of America.

TECHNICAL FIELD

This invention relates to a fire-resistant safety glazing product and to the manufacture or production of a fire-resistant safety glazing product in which reinforcing wire mesh is incorporated in the glazing product.

BACKGROUND ART

Wired glass has been in production for many years and in general provides a greater measure of security than ordinary clear or obscure annealed glass. In particular wire glass is widely used as glass balustrading, the wire being effective in preventing people or objects falling completely through the glass when the glass is broken. Wire glass is also used in glass pass doors to act as a barrier for preventing a hand or arm going through the glass accidentally and to hold the glass together longer when exposed to fire and heat. In this latter respect all glass will melt at a high enough temperature. However the wire in the wired glass holds the melting and sagging glass in its original position much longer than unwired glass.

There are three common types of wired glass, namely "Georgian" wired glass which has a square mesh, "Hexagonal" wired glass which has a hexagonal mesh and "Diamond" wired glass which has a diamond shaped mesh. The wires of the meshes are welded together, e.g. electrically welded together, at their intersecting or cross-over points and are typically made of steel, e.g. chemically treated steel. With "georgian" wired glass the area of each square mesh opening is typically about 155 mm$^2$ (wires spaced 12.5 mm apart), and the wires typically have a gauge of 0.46 mm. Such wire mesh has good reinforcing properties, improves the fire-resisting properties of the glass and does not obstruct or impair the view through the glass to any great extent.

Known wired glass is generally manufactured by the same basic method of feeding wire mesh into the glass as it passes in a fairly molten state between rollers of a roller system and then cooling the glass to solidify it. However this process is unsatisfactory in three respects. Firstly, the pull on the wire mesh as it is fed into the molten glass distorts the wire mesh so that, with square mesh for instance, the cross wires are not completely straight but become bent. Secondly, the wire mesh tends not to be positioned centrally in the solidified glass. Thirdly the process is costly, especially if the wired glass subsequently has to be further treated, e.g. by grinding and polishing to produce "polished plate" glass.

In 1982 the British Standards Institute published BS 6262:1982 relating to codes of practice for glazing for buildings. This standard took recognition of the danger of serious accidents which could occur from ordinary glass when glazed in certain locations and recommends that safety glass or material should be used in these locations, "safety glass" being specified as laminated or toughened glass. A simple laminated glass comprises two sheets of glass bonded together by an interlayer of reinforcing material. The interlayer is able to absorb impact shock and to hold the glass in position when broken or cracked thus preventing spalling of glass fragments and preventing any part of a person's body going through the glass and causing a serious injury.

Conventional wired glass was not deemed by the British Standards Institute to constitute a "safety glass" since it was unable to meet their required safety standard. In particular it is unable to retain or hold splinters or slivers of glass brought about by impacting and fracturing wired glass.

In the prior art it is known to incorporate wire in laminated glass to fulfil three differing purposes. Firstly, to render the glass visible by incorporating in the interlayer fine wires running parallel in one direction only at approximately 30 mm centres. Secondly to provide an electric heater or alarm circuit by incorporating a continuous thin wire filament in the interlayer. Thirdly to provide a fire-resistant glass in which a conventional wired glass is laminated to another sheet of glass. However such glass is less fire-resistant than ordinary solid (monolithic) wired glass and is considerably more expensive to produce.

It has also previously been proposed in GB-A-2078166 to incorporate a wire mesh in a safety glass, the wire mesh acting as a reinforcement. However the mesh is adhered between two sheets of material to form therewith a sandwich type interlayer and is not therefore truly embedded in the interlayer and does not act to hold the interlayer together if subjected to intense heat, e.g. in a fire. Indeed the action of heat could well cause the interlayer to delaminate.

It is also known from GB-A-2125732 to provide a fine-mesh wire net in a laminated glass to act as a microwave shield. However visibility through the fine-mesh wire net is poor and its presence does not significantly reinforce the glass or assist in rendering the glass fire-resistant.

The present invention seeks to provide an improved fire-resistant safety glaze product incorporating wire mesh. The invention also seeks to provide a glazing product which is able to withstand impact shock (preferably being able to comply with BS 6206:1981 for a flat glazing product) and which is fire resistant (preferably being able to withstand a half-hour integrity fire test according to BS 476 Part 8).

DISCLOSURE OF THE INVENTION

According to one aspect of the present invention a fire-resistant safety glazing product comprising two sheets of glazing material bonded together with an interlayer of adhesive binder material and a reinforcing wire mesh consisting of metallic wires welded together at intersecting or cross-over points, is characterized in that the reinforcing wire mesh is completely embedded in the interlayer.

The interlayer can be clear (transparent), coloured or tinted. The glazing product is preferably flat but may alternatively be formed from bent glass, domes or other curved glass or glazing material.

Preferably the wire mesh comprises a first set of chemically treated, spaced apart, parallel first straight steel wires arranged at an angle, e.g. perpendicular, to a second set of chemically treated, spaced apart, parallel second straight steel wires, the criss-crossing first and second straight steel wires being electrically welded together at each cross-over point to provide rectangular, square or diamond shaped meshes. Alternatively, however, the wires of the wire mesh may be arranged to provide hexagonal meshes. Preferably the wire is made of steel (e.g. galvanised or stainless steel) as mentioned above, but other metallic wires, e.g. of copper, bronze, zinc, brass, gold or lead, may be employed.

The thickness of the interlayer is determined at least in part by the gauge of the wire of the wire mesh. With wire having a gauge of 0.46 mm, the interlayer can have a thickness as small as from 1.00 to 1.20 mm. However, the interlayer thickness may be greater, e.g. up to 2.00 mm, or smaller, e.g. down to 0.25 mm with less preferred smaller gauge wire.

There are various types of resin or resinous material which can be used to provide the interlayer and which can have varying degrees of clarity and performance, e.g. for rendering the laminate fire-resistant. Preferably the interlayer comprises a methacrylate resin with additives but other resins, such as polyester or silicate resins, can be employed.

Although the interlayer is preferably formed by the setting, polymerization or solidification of a liquid resin material introduced between spaced apart glazing sheets, it is conceivable to provide a sheet of polyvinyl butyral (PVB) having the desired wire mesh embedded therein and to bond glazing sheets thereto in a conventional manner using an autoclave, or in any similar manner of compressing and melting and laminating a wire mesh embedded interlayer between glazing sheets. Similarly two thinner sheets of PVB can be set on either side of the wire mesh and melted and laminated together, the melting and laminating ensuring that the wire mesh becomes completely embedded in the interlayer as a coherent interlayer in the finished product. However this last-mentioned method has proved less than satisfactory under test conditions, the lamination being imperfect. Therefore laminating or bonding using resinous material is preferred.

According to another aspect of the present invention a method of manufacturing a fire-resistant safety glazing product comprising bonding together two sheets of glazing material with an interlayer of adhesive binder material, the bonding process including setting of the binder material from a flowable condition, a reinforcing wire mesh consisting of metallic wires welded together at intersecting or cross-over points being between the outwardly facing surfaces of the two sheets of glazing material, is characterized in that the adhesive binder material when in its flowable condition flows around the reinforcing wire mesh so that the latter is completely embedded in the binder material when the latter sets.

Preferably the adhesive binder material is introduced in liquid form into a cavity provided between the two glazing sheets, the cavity being at least partly peripherally sealed in a liquid tight manner and containing the wire mesh. Alternatively, one of the sheets of glazing material is positioned substantially horizontally and provided with a peripheral seal, the wire mesh is positioned on top of the said one sheet and liquid adhesive binder material is poured onto said one sheet inside said peripheral seal and finally the other sheet of glazing material is positioned on top of the peripheral seal and the assembly allowed to set. In this case the bottom sheet may be urged downwards in its centre, e.g. by the natural weight of the glazing material or with the use of suction cups or the like, to assist in the containment of the liquid adhesive binder material.

Conveniently the wire mesh is under tension during setting of the adhesive binder material, or alternatively depending on the gauge rigidity and tension of the wire, it can be left free to adopt its own position in the interlayer when the adhesive binder material is in its liquid form. In fact it has been found that the surface tension and viscosity of the liquid adhesive binder material ensure that in most applications the wire mesh is embeds itself centrally in the interlayer. This phenomenon of the wire mesh "floating" in the liquid adhesive material is extremely important in respect of the quality of the finished product in large scale manufacture, the tensioning of the wire being time consuming and impractical for large scale, fast production. In tests it has been found that the wire mesh "freely floats" into a centralized position when wire mesh having a gauge of from 0.46 to 0.70 mm is selected, the cavity or interlayer thickness being from 1 mm to 2 mm and the liquid adhesive binder material when introduced into the cavity having a kinematic viscosity in the range of from 2.59 cSt to 5.97 cSt at 20° C. It is believed that the surface tension of the adhesive binder material prevents the wire mesh from breaking the surface of the adhesive material and ensures that the wire mesh remains suspended within the interlayer. Thus with adhesive binder material having a pouring kinematic viscosity of 2.593 cSt, and using 12.5 mm square wire mesh having a wire gauge of 0.46 mm with a 1 mm thickness interlayer, the wire mesh is suspended approximately 0.25 mm from the surface of the binder material. Thus using an interlayer thickness of only from 1.0 mm to 1.2 mm, a reasonable centralization of the wire mesh within the encapsulating adhesive binder material is obtained. Centralization may not be obtained if substantially thicker interlayers are used.

Typically the manufacturing method is similar to that described in GB-B-2155856 in my own name.

Peripheral sealing of the sheets of glazing material in a liquid tight manner may be provided by double sided adhesive tape or strip which is either solid (i.e. gas impervious) or gas permeable. Alternatively solid mastic, butyl tapes or extrusions may be employed for peripheral sealing, although care has to be taken to avoid chemical reactions with the interlayer material. Indeed any suitable material can be used which will seal the periphery satisfactorily and will remain unaffected by, or will not affect, e.g. optically, the chemical interlayer.

BRIEF DESCRIPTION OF THE DRAWINGS

Embodiments of the invention will now be described, by way of example, with reference to the accompanying drawings, in which.

MODES FOR CARRYING OUT THE INVENTION

Figure 1A:
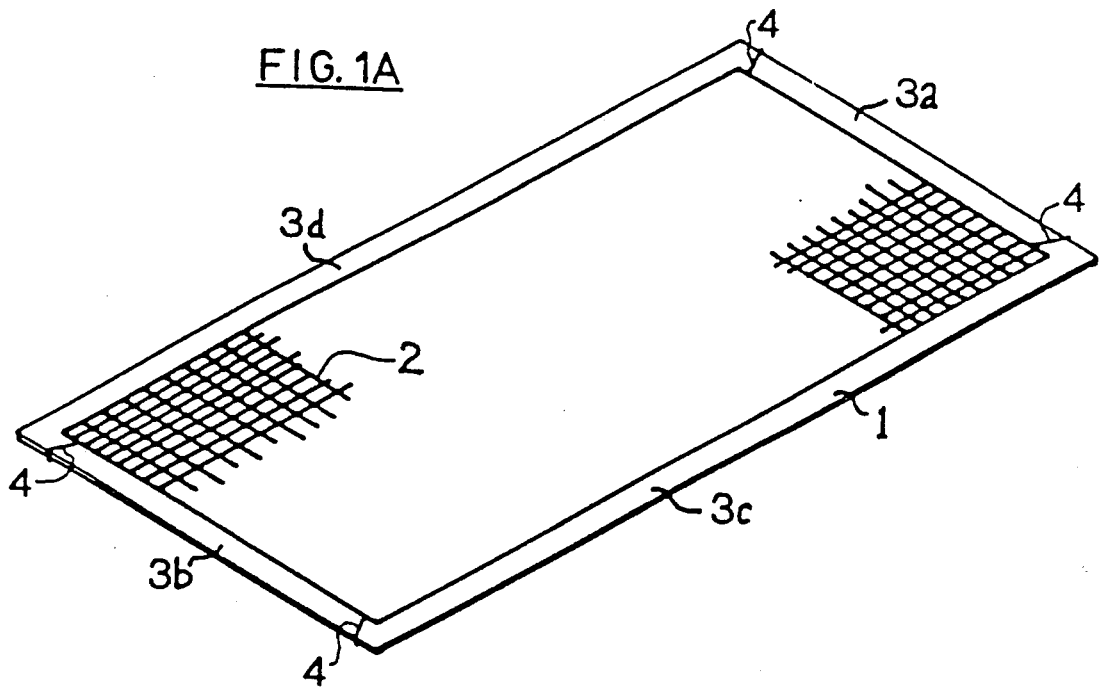
FIG. 1A shows reinforcing wire mesh positioned on a glazing sheet and illustrates a step in a first method of manufacturing fire-resistant safety glass according to the invention.
Figure 1B:
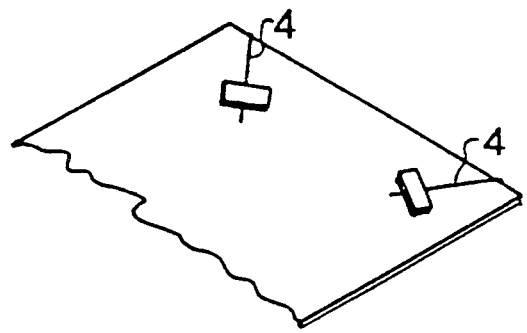
FIG. 1B shows the underside of part of the glazing sheet shown in FIG. 1A and illustrates how the wire mesh is anchored under tension to the glazing sheet.

In the first method of manufacturing a fire-resistant safety glazing pane 1, typically of glass, of the desired thickness, e.g. 3 mm, and size is cleaned and laid horizontally, e.g. on a table. A selected metallic wire mesh 2 having crossing wires welded together at their crossover points, is cut to a smaller size than the glazing pane 1 and is then laid horizontally on top of the pane 1. The mesh 2 is positioned so that there is an uncovered peripheral border 3, consisting of end border regions 3a and 3b and side border regions 3c and 3d, extending around the entire periphery of the pane 1 as shown in FIG. 1A. If desired a short length 4 of very fine wire is attached to each corner of the wire mesh 2 and the wire lengths 4 are then taken round the edges of the glazing pane 1 over the end border regions 3a and 3b and are bonded to the opposite face of the pane 1 by any temporary adhesive method, e.g. with use of adhesive tape 5 as shown in FIG. 1B. Before adhering the wire lengths 4 to the pane 1, the lengths are slightly tensioned to ensure that the mesh 2 will remain reasonably flat, without kinks.

Figure 1C:
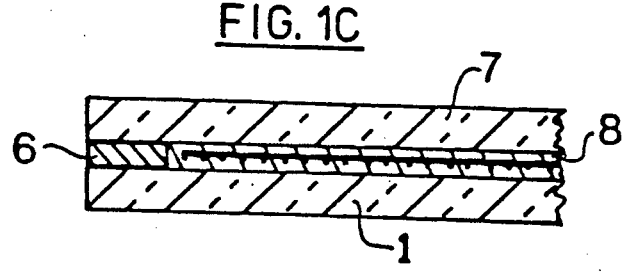
FIG. 1C is an enlarged sectional view through part of a fire-resistant safety glass manufactured by the method and prior to edge trimming of the peripheral seal to produce the finished product.

Lengths of double-sided adhesive strip material, e.g. Normount V2500 flexible adhesive tape (Normount being a trade name of the U.S. company Normount Performance Plastics), or flexible adhesive tape No. 910 from Technibond Ltd., are then adhered to the border regions 3a–3b but not quite along the full length of border region 3b. Thus small air gaps, each typically about 2 mm wide, are left in the strip material at opposite ends of the border region 3d. Non-adhesive backing layers on the lengths of strip material are then peeled back a short way and a precleaned second glazing pane 7 (see FIG. 1C) of similar size to, and typically the same thickness e.g. 3 mm, of the first glazing panel 1, is positioned on, so as to be supported by, the lengths of strip material so as to be in face-to-face relationship with the pane 1. The nonadhesive backing layers on the lengths of strip material covering border regions 3a–3c are then peeled off and the glazing panes pressed together so that the strip material is adhered to both glazing panes and provides a peripheral seal. The first and second glazing panes and the peripherally sealing strip material define a cavity in which the wire mesh 2 is located. The cavity thickness is determined by the thickness of the peripheral strip material and may typically be from 0.5 mm to 2.5 mm thick, or as desired, e.g. 1.2 mm thick.

The assembly of sealed glazing panes is raised into an inclined position, e.g. from 15 degrees to 65 degrees, typically from 20 degrees to 40 degrees, with its unsealed edge (i.e. along border region 3d) uppermost. The unsealed edge is carefully prized apart, i.e. the second glazing panel is lifted clear of the underlying length of strip material which still has its non-adhesive backing layer in place, and a broad but thin spout of a pouring funnel is inserted therein.

A predetermined quantity of settable liquid bonding material is then poured through the funnel into the cavity between the first and second glazing panes. The funnel is then removed, the backing layer is removed from the last length of strip material, and the upper edges of the glazing panes are pressed together. The glazing pane assembly is then lowered, e.g. into a horizontal position or into a reverse inclination, so that the introduced liquid bonding material flows towards the one, two or more air gaps in the peripheral "seal", expelling air as it moves towards the air gaps. When the liquid bonding material reaches the air gaps, the latter are sealed, e.g. with suitable filling material, and the assembly is moved into (or retained in) a horizontal position during setting of the bonding material. This method follows substantially the laminating method disclosed in my Patent GB-B-2155856 and further details of steps of the laminating technique given in that patent specification.

After the bonding material has set, the projecting ends of the wire lengths 4 are removed. The finished product is in the form of a fire-resistant "Safety Glass" (see FIG. 1C) comprising two glazing panels 1, 7 bonded together by an interlayer 8 in which a metallic wire mesh is embedded centrally. The peripheral seal is then cut and removed to provide the final product.

The use of the wire lengths 4 for tensioning the wire mesh 2 may be dispersed with if the wire mesh is of suitable gauge and reasonable rigidity, whereby the phenomena of the relationship between the wire mesh, surface tension and viscosity effect of the resin as previously described ensures consistent centralization of the wire mesh on completion of the setting or polymerization of the adhesive resin.

A fire-resistant safety glass produced by the method described above and consisting of two glass sheets bonded together by a methacrylate resin and additive having wire mesh embedded therein, has passed the half-hour integrity test and a one hour stability test under BS 476: Part 8: 1972 (Certificate No. J8053/3 of Yarsley Technical Centre, Redhill, Surrey, United Kingdom)—although this is not absolutely necessary commercially—and Safety Test BS 6206 1982. For the fire test certificate a 1 mm interlayer thickness was employed with two 3 mm thick glass panels. 12.5 mm square steel wire mesh of the type used in conventional "Georgian" wired glass was used for the wire mesh. The liquid bonding material was a clear methacrylate resin having a pouring kinematic viscosity at 20° C. of 2.593 cSt.

The liquid bonding material may be of any suitable type used in glass laminating techniques and examples of suitable resin or resinous bonding materials, such as methacrylate resin (the presently preferred resin) or polyester resin, are given in GB-B-2155856 and GB-A-2178363. It should also be added that additives may be employed in the resins to increase the fire-resistance of the cured resin material. Some resin materials cure adequately at room temperatures while other require higher temperatures (e.g. IR heaters or warm air) or need to be exposed to UV radiation (e.g. for windscreen repairs) or radiation at microwave frequencies, e.g. from 1000–2500 MHz. In general the use of resin heating to the particular optimum temperature of the resin can accelerate curing by up to 80 per cent. In production, to enable reproducible results, it is preferred to heat the glazing products to a specific temperature so that the room temperature (which may vary) does not influence curing. Examples of methacrylate resin are "Naftolan" sold by Chemetall (West Germany) and "Plexmon 900" sold by Rohm (West Germany). Other examples of usable resins are diethylene glycol bis allyl carbonate (e.g. "Nouryset 200" sold by Akzo Chemie, Holland, or "Allymer CR 39"), polyester resin, liquid PVB (e.g. "Butvar"), poly(ethylene-vinyl acetate) and poly(ethylene-methyl-methacrylate). However nearly all these compositions are not as attractive as methacrylate resin.

The strip material described herein for the peripheral seal is gas-impervious or non-gas permeable and the provision of air holes or gaps in the peripheral seal is required to allow the release of air from the cavity. However other types of peripherally sealing material may be employed, for example gas-pervious or gas-permeable tape, which is known in the art, in which air, but not the liquid bonding material, is able to pass therethrough. With such a peripheral seal the air holes or gaps in the seal can be dispensed with. The perimeter seal can also be achieved using, polyisobutylene (cored or uncored), butyl tape or butyl, silicone which can also be used on the external perimeter edges of the glass, numerous mastics and tapes metallizing the edges, for example with metal arc spray or similar, in fact any perimeter binder which will contain the interlayer liquid or otherwise.

Although a hand pouring technique has been described for introducing the liquid bonding material into the cavity, other liquid introducing techniques may be employed such as machine injection, with resin mixing and metering machines, using either one filling hole, or a number of holes for air release or the gas-permeable liquid barrier.

Other techniques may be employed for keeping the wire mesh in a reasonably flat position during setting of the liquid bonding material. For example the wire mesh may be oversize and laid over the entire glazing pane 1. The edges of the wire mesh are then bent over and around the edges of the pane 1 either prior to or after application of the peripheral seal.

In all instances the sealing edges of the mesh "reinforced", fire-resistant, laminated safety glass can be cut and removed if desired. Also the glass can be cut to desired sizes by the same methods used to cut ordinary laminated glass. Because of this ability to peripherally trim the glass, it is also possible to use a wider peripheral seal and to trap reinforcing wire mesh under the peripheral seal, the wire mesh, however, not extending outwardly of the glazing panes, or alternatively sandwiching the extended mesh between two adhesive binders of requisite thickness.

Figure 2A:
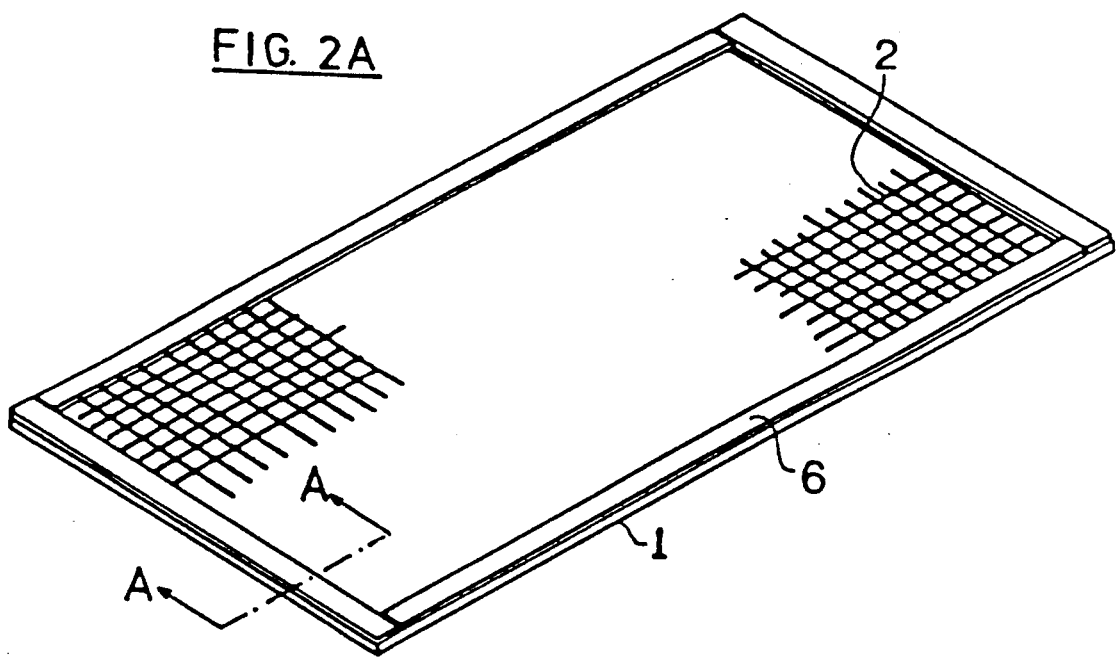
FIG. 2A shows wire mesh positioned on a glazing sheet and illustrates a step in a second method of manufacturing a fire-resistant safety glazing product according to the invention.
Figure 2B:
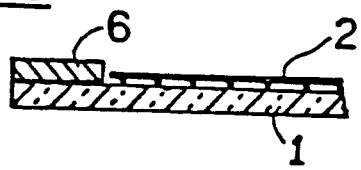
FIG. 2B is a detail on line A—A of FIG. 1A.

FIGS. 2A and 2B illustrate steps of a second method of producing laminated fire-resistant safety glass according to the invention. This second method is almost the same as the first method, but is generally simpler. Typically interlayers of from 0.5 mm to 2 mm between the spaced apart glazing panes can be employed, depending on the gauge of wire mesh selected.

In the second method, the first pane 1 of glass or other glazing material has a peripheral seal 6 applied thereto. The wire mesh 2 is cut to a size to fit inside the peripheral seal 6 and is laid on the horizontal pane 1 in a position just short of the peripheral seal 6 as shown in FIGS. 2A and 2B. The second pane (not shown) is then placed in position and the procedure followed as in the first method described above.

It should be noted that, in the methods described herein, when the liquid resin or other settable liquid bonding material is introduced into the interlayer between the spaced apart glazing panes, the liquid bonding material flows around the wire mesh and suspends the latter within the bonding material. This is described as a "free floating suspension method". When the bonding material fully cures, the wire mesh is reasonably centrally positioned within the interlayer, although this is not necessary for the finished product.

The glazing panes are preferably supported on a table which can be manually or automatically tilted, e.g. with a two way tilting mechanism, generally termed concentric (i.e. enabling simultaneous tilting in the horizontal and vertical planes) or merely with the use of a simple horizontally tilting table. Alternatively an ordinary static table can be used with the glazing panes being tilted up and down relative to the table.

Another method of producing safety glass according to the invention involves following the procedure set out in the description of GB-B-2155856 until the position is reached where the envelope of glazing panes is assembled in position prior to the removal of the backing tapes from the peripheral seals. The bottom backing tape is then removed and the two side backing tapes are partially removed until approximately two thirds of the adhesive tape is exposed on either side. The glazing panes are then pressed together to form a peripheral seal on the bottom edge and partially up to the two sides. The "envelope" is then opened up sufficiently at the top to permit a sheet of wire mesh, which has been cut to fit inside the peripheral seal, to be slid down into the envelope which is in the inclined position. The remaining parts of the side backing tape are then removed and the laminating procedure continues normally, e.g. as described in the first method of this description. This particular method is more suitable for smaller size areas of laminating.

For large glazing areas, the two glazing panes can be sealed around their perimeters and laid on to a tilting table fitted with hydraulic or pneumatic clamps which hold the glass together around the edges to prevent leakage (which is more likely with large areas). The resin can be machine mixed and dispensed, e.g. under pressure, via a nozzle into the interlayer cavity which will be in an inclined position on the tilting table. When the desired amount of liquid bonding material is deposited in the cavity, the table is lowered, e.g. to the horizontal position, for air venting and setting of the bonding material.

Another method which can be used for very large areas of glazing panes, is a method employing a slightly concave tilting table. A large pane of glass is laid on the table and sealing material as previously described is laid around the glass perimeter. Preferably a complete, gas permeable peripheral seal is provided. However if non-gas permeable material is used, vent openings to expel air must be used. The glass, because of its large area, has the ability to bend and sink to an extent into the concave table. Alternatively, the centre of the glass pane can be pulled downwards by means of one or more rubber suction cups which can hold the horizontal glass in a concave manner. Wire mesh of a size slightly smaller than the glass pane is laid horizontally on the glass pane inside the previously sealed perimeter. The desired amount of resin, e.g. methacrylate resin, is poured or dispensed by machine into the centre of a glass concave. Another similarly sized glass pane is then placed exactly over the first pane, usually by means of rubber suckers, and the peripheral edges pressed together. The concave bottom pane is then released from its depressed position, by either moving the table back to a horizontal condition or releasing the underneath suction cups. The central pool of the resin layer then expands outwards until the perimeter sealing is reached. The wire mesh "floats" in the resin and is unaffected by this movement.

One of the drawbacks of this method is that the glass may break from physical stress although this would not occur if plastic, e.g. acrylic or polycarbonate, sheets were used.

It is possible to locate two panes of glass vertically for cavity filling/curing. Expelling of air is speeded up and pressure plates on either side of the glass panes prevent outward bulging.

A semi-automatic production line can be set up to manufacture laminated fire-resistant glass comprising a line of rubber castor tables on to which are fed, from two rubber castor concentric tilting or ordinary tilting tables, the bonded and filled glazing sheets. The glazing sheets are assembled on the rubber castor tilting table in the horizontal position, as previously described. The tilting table is then raised to the desired tilted position for resin filling by hand or machine. The perimeter edge or filling opening(s) are sealed or left with vent holes as desired and the table returned to its horizontal position. The wire mesh "floats" to the desired central position due to the resin viscosity and interlayer thickness. The glass is rolled away on the rubber castor tables for final curing. Machine dispensing of resin is particularly suitable if glass sizes are repetitive.

The glazing panes may be of glass, annealed glass, toughened glass, emissivity glass or plastics material, e.g. acrylic, perspex, PVC, polycarbonate or the like. The panes may be clear, patterned, tinted or coloured.

Instead of the glazing panes being permanently secured to the interlayer, one of the panes may be releasable therefrom, e.g. by treating its face with a release agent prior to laminating. Resin such as diethylene glycol bis allyl carbonate with additive(s) are particularly suitable for this method.

In all applications the wire mesh acts to reinforce the glazing product, although its main purpose is to provide the glazing product with a degree of fire resistance by retaining the interlayer in a coherent form even when it begins to melt in the presence of intense heat. The wire mesh can also expand in the resilient interlayer when subjected to heat absorption without causing the glass to break—a common problem with conventional wired glass. Also the peripherally exposed edges of the wire mesh are less likely to rust since the wire does not become detached from the resin interlayer and the rusting will not spread back along the wires. Tinted wired glass is usually not produced with conventional wired glass since it has an increased heat absorption, the different coefficients of expansion of the glass and wire resulting in cracking of the wire. However a resinous interlayer can absorb the increased heat expansion. Furthermore the fire-resistant safety glazing product of the invention can be used as a roof covering since, even if the glass cracks, water will not penetrate through the resin interlayer.

Conventional chemically treated steel wire mesh used in conventional wired glass produced by Pilkington Brothers PLC is the preferred wire mesh. This mesh has a grid of wires providing a 13 mm$^2$ (or 12.5 mm$^2$) square mesh size with the wires being electrically welded together at each intersecting or cross-over point. However other types of reinforcing mesh may be employed provided that it consists of metallic wires welded together at intersecting or cross-over points. The steel wire may be galvanized or stainless steel. Other types of metal which may be used are copper, bronze, zinc, brass, gold or lead. The mesh shape may be rectangular, square, hexagonal or diamond shaped.

It is also conceivable to produce a PVB sheeting with a wire mesh embedded therein, bonding of the interlayer being achieved with an autoclave. Similarly the mesh could be laid between two PVB sheets and processed through the autoclave in the normal manner, resulting in the wire mesh becoming completely embedded in the interlayer.

INDUSTRIAL APPLICABILITY

The invention finds application in the manufacture of fire-resistant safety glass or glazing products incorporating wire mesh. The glazing products can be produced more cheaply than conventional wired glass. Furthermore the wire mesh is not distorted during the manufacturing process.

I claim:

1. A fire-resistant safety glazing product comprising two sheets of glazing material and an interlayer of adhesive binder material bonded with said two sheets of glazing material and having completely embedded therein a reinforcing wire mesh consisting of metallic wires welded together at intersecting or cross-over points, the interlayer having a thickness of from 0.25 mm to 2.0 mm, and being formed by one of setting and solidification of the adhesive binder material from an initial flowable condition.

2. A glazing product according to claim 1, wherein said interlayer has a thickness from 0.5 mm to 1.75 mm.

3. A glazing product according to claim 1, wherein said wire mesh comprises steel wire mesh.

4. A glazing product according to claim 1, wherein the wire mesh is one of square, rectangular, diamond and hexagonal meshes.

5. A glazing product according to claim 1, wherein said adhesive binder material comprises one of transparent, clear, obscure, tinted, and colored resin and resinous chemical material.

6. A glazing product according to claim 5, wherein said resin is a methacrylate resin.

7. A glazing product according to claim 1, wherein said interlayer has a thickness of at least 1.0 mm, and the wire mesh has a gauge of from 0.46 mm to 0.70 mm.

* * * * *